United States Patent
Ueno

(10) Patent No.: US 12,276,336 B1
(45) Date of Patent: Apr. 15, 2025

(54) CONTROL DEVICE FOR VEHICLE

(71) Applicant: TOYOTA JIDOSHA KABUSHIKI KAISHA, Toyota (JP)

(72) Inventor: Koki Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/760,257

(22) Filed: Jul. 1, 2024

(30) Foreign Application Priority Data

Sep. 27, 2023 (JP) ................. 2023-166555

(51) Int. Cl.
*F16H 59/10* (2006.01)
*F16H 61/18* (2006.01)
*F16H 61/16* (2006.01)

(52) U.S. Cl.
CPC ........... *F16H 59/105* (2013.01); *F16H 61/18* (2013.01); *F16H 2061/163* (2013.01)

(58) Field of Classification Search
CPC ........ F16H 59/105; F16H 61/16; F16H 61/18; F16H 2061/163
See application file for complete search history.

(56) References Cited

U.S. PATENT DOCUMENTS

| | | | |
|---|---|---|---|
| 2004/0259685 A1* | 12/2004 | Inoue | F16H 59/105 |
| | | | 477/118 |
| 2017/0370467 A1* | 12/2017 | Uejima | F16H 61/18 |
| 2024/0159311 A1* | 5/2024 | Ozawa | F16H 59/105 |

FOREIGN PATENT DOCUMENTS

JP 2016-223501 A 12/2016

* cited by examiner

*Primary Examiner* — Timothy Hannon
(74) *Attorney, Agent, or Firm* — SoraIP, Inc.

(57) ABSTRACT

The vehicle includes a power source, a power transmission device that transmits power from the power source to a drive wheel, and an operation device that is operated by a driver to an operation position corresponding to a shift position of the power transmission device. The control device of the vehicle includes a shift control unit that changes an N-position switching time from when the vehicle is operated to the neutral operation position until when the vehicle is switched to the neutral position based on the vehicle state. The shift control unit shortens the N-position switching time as compared with a case where the driving force of the drive wheel is large.

5 Claims, 5 Drawing Sheets

FIG. 4A

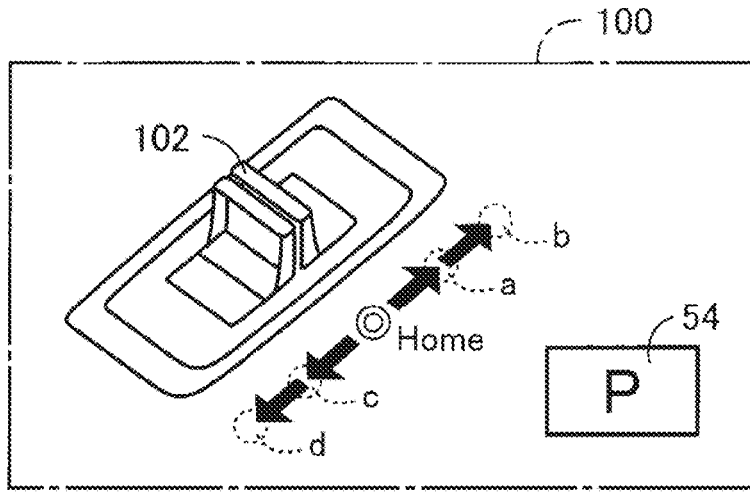

FIG. 4B

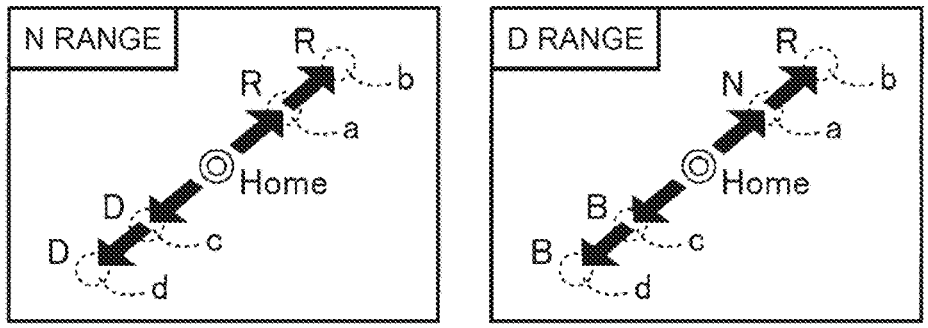

FIG. 4C

| VEHICLE STATE | | N OPERATION DETERMINATION TIME | N RANGE SWITCHING TIME |
|---|---|---|---|
| STOP | | DEFAULT VALUE (TMS (SHORT TIME) [ms]) | ← (N RANGE SWITCHING IMMEDIATELY SWITCH TO N WITH NO DELAY TIME) |
| TRAVEL | ACCELERATOR OFF | TMS (SHORT TIME) [ms] | TML (LONG TIME) [ms] (N RANGE SWITCHING SWITCH TO N AFTER ELAPSE OF DELAY TIME) |
| | ACCELERATOR ON | TMS (SHORT TIME) [ms] | ← (N RANGE SWITCHING IMMEDIATELY SWITCH TO N WITH NO DELAY TIME) |

CONTROL DEVICE FOR VEHICLE

CROSS-REFERENCE TO RELATED APPLICATION

This application claims priority to Japanese Patent Application No. 2023-166555 filed on Sep. 27, 2023, incorporated herein by reference in its entirety.

BACKGROUND

1. Technical Field

The present disclosure relates to control devices for vehicles including an operation device configured to be operated to an operation position corresponding to a shift position of a power transmission device configured to transmit power from a power source.

2. Description of Related Art

There is known a control device for a vehicle including a power source, a power transmission device configured to transmit power from the power source to drive wheels, and an operation device configured to be operated by a driver to an operation position corresponding to a shift position of the power transmission device. The shift position of the power transmission device is switched by electrical control based on the operation position. The shift position includes a neutral position in which power transmission in the power transmission device is interrupted. The operation position includes a neutral operation position for selecting the neutral position. For example, there is a shift switching device for a vehicle described in Japanese Unexamined Patent Application Publication No. 2016-223501 (JP 2016-223501 A). The operation device disclosed in JP 2016-223501 A has an automatic return type operation element that is returned to its original position when no external force is applied. The operation device switches the shift position based on the operation position at which the operation element is held for a determination time or longer. The operation device sets the determination time for this operation based on the operation speed of the operation element to the operation position corresponding to a brake position of the power transmission device.

SUMMARY

When a situation in which the driving force is desired to be cut off occurs during traveling, it is desirable that the power transmission device be quickly switched to the neutral position. In this case, it is possible to apply the technique described in JP 2016-223501 A to setting of the determination time for the operation of switching to the neutral operation position for selecting the neutral position. However, the operation speed of the operation element to the neutral operation position does not always reflect the situation in which the driving force is desired to be cut off during traveling. Therefore, there is a possibility that switching to the neutral position may occur more than necessary due to the operation of switching to the neutral operation position during traveling.

The present disclosure was made in view of the above circumstances, and it is an object of the present disclosure to provide a control device for a vehicle that can improve erroneous switching prevention performance and switching response performance regarding switching to the neutral position during traveling.

The gist of a first disclosure is a control device for a vehicle. The vehicle includes a power source, a power transmission device configured to transmit power from the power source to a drive wheel, and an operation device configured to be operated by a driver to an operation position corresponding to a shift position of the power transmission device, the power transmission device being a device configured in such a manner that the shift position is switched by electrical control based on the operation position, the shift position including a neutral position in which power transmission in the power transmission device is interrupted, and the operation position including a neutral operation position for selecting the neutral position. The control device includes a shift control unit configured to change a neutral position switching time based on a vehicle state, the neutral (N) position switching time being a time from when the operation device is operated to the neutral operation position to when the shift position is switched to the neutral position. The shift control unit sets the neutral position switching time to a smaller value when a driving force of the drive wheel is large than when the driving force of the drive wheel is small.

According to the first disclosure, the neutral position switching time from when the operation device is operated to the neutral operation position to when the shift position is switched to the neutral position is set to a smaller value when the driving force of the drive wheel is large than when the driving force of the drive wheel is small. Accordingly, when the driving force of the drive wheel is relatively large, there is a possibility that the situation is that the driving force is desired to be cut off, and therefore the shift position is switched to the neutral position in a relatively short time after the operation device is operated to the neutral operation position. On the other hand, when the driving force of the drive wheel is relatively small, the situation is highly likely not to be the situation where the driving force is desired to be cut off, and therefore the shift position is switched to the neutral position over a relatively long time after the operation device is operated to the neutral operation position. Therefore, it is possible to improve the erroneous switching prevention performance and the switching response performance regarding switching to the neutral position during traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A is a diagram illustrating a shift operation device separate from the shift operation device of FIG. 1;

FIG. 4B is a diagram illustrating a shift operation device separate from the shift operation device of FIG. 1;

FIG. 4C is a diagram illustrating a shift operation device separate from the shift operation device of FIG. 1;

DETAILED DESCRIPTION OF EMBODIMENTS

In an embodiment of the present disclosure, the power source is an engine that generates power, for example, by combustion of fuel. Further, the vehicle may include, as the power source, an electric motor or the like in addition to or instead of the engine.

The power transmission device includes, for example, an automatic transmission. Examples of the automatic transmission include a planetary gear type automatic transmission, a belt-type continuously variable transmission, a synchronous meshing type parallel-2-axis type automatic transmission, and a Dual Clutch Transmission (DCT), and an electric type continuously variable transmission.

Hereinafter, embodiments of the present disclosure will be described in detail with reference to the drawings.

First Embodiment

Figure 1:
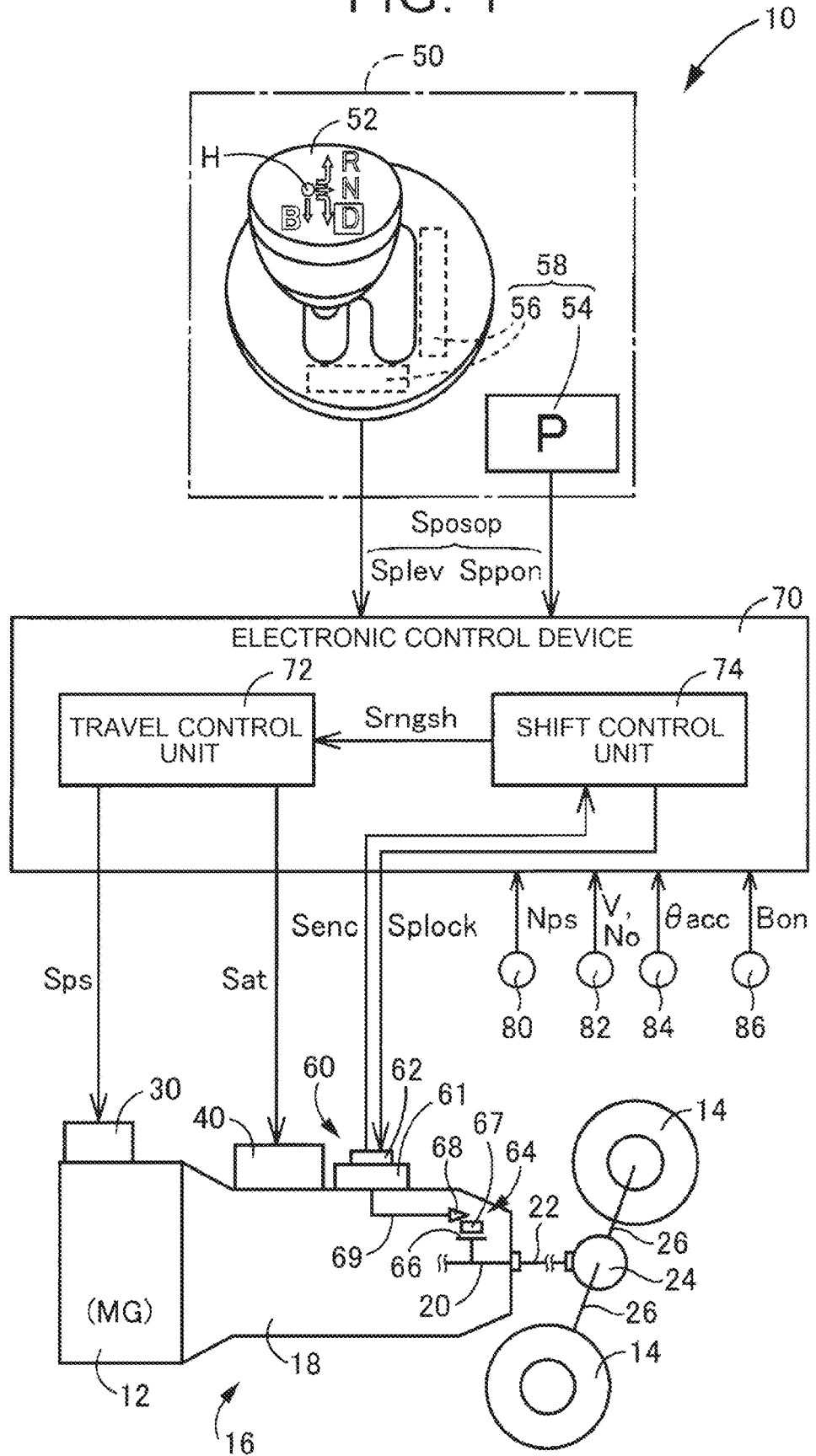
FIG. 1 is a diagram for explaining a schematic configuration of a vehicle to which the present disclosure is applied, and is a diagram for explaining a control function for various kinds of control in a vehicle and a main part of a control system.

FIG. 1 is a diagram illustrating a schematic configuration of a vehicle 10 to which the present disclosure is applied. FIG. 1 is a diagram for explaining a control function for various types of control in a vehicle 10 and a main part of a control system. In FIG. 1, the vehicle 10 includes a power source 12, drive wheels 14, and a power transmission device 16 that transmits power from the power source 12 to the drive wheels 14.

In the power source 12, a power source torque Tps, which is a torque of the power source 12, is controlled by the power source control device 30 provided in the vehicle 10 being controlled by an electronic control device 70 described later.

The power transmission device 16 includes an automatic transmission 18, a propeller shaft 22, a differential gear 24, a drive shaft 26, and the like. The propeller shaft 22 is coupled to the output shaft 20 of the automatic transmission 18. The differential gear 24 is coupled to the propeller shaft 22. The drive shaft 26 is coupled to the differential gear 24. In the power transmission device 16, the power output from the power source 12 is transmitted to an automatic transmission 18 connected to the power source 12. The power transmitted to the automatic transmission 18 is transmitted from the automatic transmission 18 to the drive wheels 14 via the propeller shaft 22, the differential gear 24, the drive shaft 26, and the like.

In the automatic transmission 18, for example, the hydraulic actuator in the automatic transmission 18 is operated by the hydraulic pressure output from the hydraulic pressure control circuit 40 provided in the vehicle 10, so that the gear shift is performed in accordance with the accelerator operation amount θacc, the vehicle speed V, and the like. The hydraulic pressure control circuit 40 regulates the hydraulic pressure to be output to the automatic transmission 18 by being controlled by an electronic control device 70 described later.

The vehicle 10 further includes a shift operation device 50, a switching device 60, and the like. In the vehicle 10, the shift range RNGsh of the automatic transmission 18 is switched using a shift-by-wire (SBW) method. The shift range RNGsh is synonymous with the shift position. That is, the range in the shift range is synonymous with the position (=position).

The shift operation device 50 is an operation device for selecting a plurality of types of shift range RNGsh in the automatic transmission 18 by artificial operation. In other words, the shift operation device 50 is an operation device that is artificially operated to receive a shift range RNGsh switching request of the automatic transmission 18. The shift operation device 50 is operated by the driver to an operation position (=operation position) POSop corresponding to the shift range RNGsh of the automatic transmission 18. The operation position POSop includes, for example, P, R, N, D, and B operation positions. The shift range RNGsh of the automatic transmission 18 is synonymous with the shift range of the power transmission device 16. In the automatic transmission 18, that is, the power transmission device 16, the shift range RNGsh is switched by electric control based on the operation position POSop.

The P operation position is a parking operation position for selecting a parking range (=P range) of the automatic transmission 18. The P range of the automatic transmission 18 is a shift range RNGsh in which the automatic transmission 18, that is, the power transmission device 16 is in a neutral state and the rotation of the output shaft 20, which is a rotation member that rotates together with the drive wheels 14, is mechanically blocked. The neutral state of the automatic transmission 18 is a state in which the power transmission in the automatic transmission 18, that is, the power transmission device 16 is interrupted, that is, a state in which the automatic transmission 18 cannot transmit power. The state in which the rotation of the output shaft 20 is mechanically blocked is a state in which the output shaft 20 is mechanically fixed so as not to rotate, and is a parking lock (=P lock) state of the automatic transmission 18. The output shaft 20 is mechanically fixed in a non-rotatable manner by the switching device 60.

The R operation position is a reverse travel operation position for selecting a reverse travel range (=R range) of the automatic transmission 18. The R range of the automatic transmission 18 is a shift range RNGsh that enables the vehicle 10 to travel backward. The N operation position is a neutral operation position for selecting a neutral range (=N range) of the automatic transmission 18. The N range of the automatic transmission 18 is a shift range RNGsh in which the automatic transmission 18 is in a neutral condition. The D operation position is a forward travel operation position for selecting a forward travel range (=D range) of the automatic transmission 18. The D range of the automatic transmission 18 is a shift range RNGsh that enables the vehicle 10 to travel forward. The B operation position is a deceleration forward travel operation position for selecting a brake range (=B range) of the automatic transmission 18. The B range of the automatic transmission 18 is a shift range RNGsh in which the rotation of the drive wheels 14 is decelerated by causing the power source braking effect to be larger than the D range during the forward travel. The power source brake is, for example, an engine brake when the power source 12 includes an engine, and a regenerative brake when the power source 12 includes an electric motor.

Each of the R, N, D, and B ranges of the automatic transmission 18 is a shift range RNGsh in which the output shaft 20 is allowed to rotate, and is a non-parking range (=non-P range) of the automatic transmission 18. Each of the R, N, D, and B operation positions is a non-parking operation position (=non-P operation position) for selecting a non-P range of the automatic transmission 18. The state in which the rotation of the output shaft 20 is permitted is a state in which the mechanical fixing of the output shaft 20 is released, that is, a state in which the P-lock state of the automatic transmission 18 is released, and a non-parking lock (=non-P lock) state of the automatic transmission 18.

The shift operation device 50 includes an operation element that is selectively operated by the driver to a plurality of operation positions POSop corresponding to the plurality of shift range RNGsh of the automatic transmission 18. The operation element is, for example, a shift lever 52 and a P switch 54. The P switch 54 is an operation element provided separately from the shift lever 52. The operation position POSop of the shift lever 52 is the lever position (=lever position) Plev, and the operation position POSop of the P switch 54 is the P switch-on position (=P switch-on position) Ppon. Both the shift lever 52 and the P switch 54 are automatic return type, i.e., momentary type operation elements that are returned to their original positions in a state where no external force is applied thereto. In the present embodiment, this original position is referred to as a home position (=home position). The shift operation device 50 includes, as the operation position POSop, a home position which is returned when not operated by the driver. The shift operation device 50 has, as operation position POSop, a plurality of types of absolute positions in which the operation element is operated with respect to the home position. The plurality of types of absolute positions includes P, R, N, D, B operation positions, and the like.

The shift lever 52 is alternatively operated by the driver to the lever position Plev corresponding to the desired shift range RNGsh in order to set the shift range RNGsh of the automatic transmission 18 to the desired shift range RNGsh among the plurality of non-P ranges. The P-switch 54 is operated by the driver to set the shift range RNGsh of the automatic transmission 18 to the P range.

The lever position Plev of the shift lever 52 is, for example, an R operation position, an N operation position, a D operation position, an H operation position, and a B operation position (see R, N, D, H, and B in FIG. 1). The H operation position is the home position of the shift lever 52.

The shift operation device 50 includes a lever position sensor 56 that detects lever position Plev. The lever position sensor 56 is a sensor for outputting a lever position Splev corresponding to the lever position Plev to an electronic control device 70 to be described later. The electronic control device 70 determines the lever position Plev based on the lever position signal Splev. Thus, the operation to the R, N, D, and B operation positions is detected. The operation to the R, N, D, and B operation positions is a shift operation for switching the shift range RNGsh of the automatic transmission 18 to any of the R, N, D, and B ranges, that is, a shift operation for switching to the non-P range, and is also referred to as a shift lever operation.

The P-switch 54 is, for example, a momentary push-button switch, and is pushed by the driver to the P-switch on position Ppon as the P-operation position. The position in a state where the P switch 54 is not pushed in is the home position of the P switch 54. Each time the P switch 54 is pushed to the P switch-on position Ppon, the P switch Sppon corresponding to the P switch-on position Ppon is outputted to an electronic control device 70 to be described later. The electronic control device 70 determines the P switch-on position Ppon based on the P switch-signal Sppon. As a result, a manipulation to the P-switch-on position Ppon is detected. The operation to the P switch-on position Ppon is a shift operation for switching the shift range RNGsh of the automatic transmission 18 to the P range, and is also referred to as a P switch operation.

The lever position signal Splev and the P-switch signal Sppon are position signal Sposop corresponding to the operation position POSop. The P-switch 54 and the lever position sensor 56 are operation position sensors 58 for outputting a position signal Sposop. The shift lever operation or the P switch operation by the driver is a shift operation in the shift operation device 50 for switching the shift range of the automatic transmission 18.

The switching device 60 includes an electric actuator 61, an encoder 62, a parking lock mechanism 64, and the like. The parking lock mechanism 64 includes a parking lock gear 66, a parking lock pawl 67, a cam 68, a parking rod 69, and the like. The switching device 60 is a P-lock device that switches between a P-lock state and a non-P-lock state by operating the electric actuator 61 based on a P-switch control command Splock from an electronic control device 70 described later. The switching device 60 switches the shift range RNGsh of the automatic transmission 18 between the P range and the non-P range.

The vehicle 10 further includes an electronic control device 70 as a controller including a control device for the vehicle 10. The electronic control device 70 includes, for example, a so-called microcomputer including a CPU, RAM, ROM, an input/output interface, and the like. CPU performs various kinds of control of the vehicle 10 by performing signal-processing in accordance with a program stored in ROM in advance while using a temporary storage function of RAM.

Various signals and the like based on detection values by various sensors and the like provided in the vehicle 10 are supplied to the electronic control device 70. Examples of the various sensors include a P switch 54, a lever position sensor 56, an encoder 62, a power source rotation speed sensor 80, an output rotation speed sensor 82, an accelerator operation amount sensor 84, and a brake switch 86. Examples of the various signals include a P-switch signal Sppon, a lever-position signal Splev, a pulse signal Senc for acquiring encoder counts, and a power source rotational-speed Nps. Other examples of the various signals include an output-shaft rotational speed No corresponding to the vehicle speed V, an accelerator opening degree θacc which is an accelerator operation amount representing a magnitude of an acceleration operation by the driver, and a brake-on signal Bon. Various command signals are output from the electronic control device 70 to each device provided in the vehicle 10. Examples of the device provided in the vehicle 10 include the power source control device 30, the hydraulic pressure control circuit 40, and the switching device 60. Examples of the various command signals include a power source control command signal Sps, a transmission control command signal Sat, and a P switching control command signal Splock.

The electronic control device 70 includes a travel control unit 72 and a shift control unit 74 in order to realize various controls in the vehicle 10. The travel control unit 72 has a function as a power source control unit and a function as a transmission control unit.

The travel control unit 72 calculates a drive request amount for the vehicle 10 by the driver by applying the accelerator operation amount θacc and the vehicle speed V to a predetermined drive request amount map, for example. The drive requirement is, for example, a required drive torque Trdem in the drive wheels 14. In view of the gear ratio of the automatic transmission 18 and the like, the travel control unit 72 outputs, to the power source control device 30, a power source control command signal Sps for controlling the power source 12 so as to obtain the power source torque Tps for realizing the required drive torque Trdem. The required driving torque Trdem [Nm] is the required driving power Prdem [W] at the vehicle speed V at that time. The required driving force Frdem [N] of the drive wheels 14 may be used as the required driving force. The travel control unit 72, for example, outputs a transmission control command signal Sat for executing shift control of the automatic transmission 18 to the hydraulic pressure control circuit 40 as needed.

The shift control unit 74 switches the shift range RNGsh of the automatic transmission 18 based on the operation position POSop in the shift operation device 50. For example, the shift control unit 74 determines a shift operation by the driver in the shift operation device 50 based on the position-signal Sposop, and sets a required range corresponding to the operation position POSop. The shift control unit 74 switches the automatic transmission 18 to the shift range RNGsh corresponding to the required range.

When setting the required range according to the operation position POSop, the shift control unit 74 determines whether or not the same position Sposop has been continuously outputted more than the shift operation determination time TMshf. When the shift control unit 74 determines that the same position signal Sposop has been continuously outputted for the shift operation determination time TMshf or longer, it determines that the operation position POSop is the operation position POSop corresponding to the same position signal Sposop. That is, the shift control unit 74 determines the shift operation by the driver in the shift operation device 50. Then, the shift control unit 74 sets a required range corresponding to the operation position POSop, and sets the shift range RNGsh of the automatic-transmission 18 to a shift range RNGsh corresponding to the operation position POSop determined based on the position-signal Sposop. The shift operation determination time TMshf is, for example, a threshold value for determining that the shift operation has been performed by the driver, and is a predetermined threshold value for determining that the shift operation has been reliably performed in the same operation position POSop by the driver's intention. In the shift operation determination time TMshf, for example, different values are set for each operation position POSop in accordance with the vehicle condition.

Upon determining the shift operation, the shift control unit 74 immediately sets the required range and outputs the shift range command signal Srngsh to the travel control unit 72. Upon receiving the shift range command signal Srngsh, the travel control unit 72 immediately switches the automatic transmission 18 to the shift range RNGsh corresponding to the shift range command signal Srngsh. The time from when the shift operation is started until when the shift range command signal Srngsh is outputted is the range switching time TMswr. The range switching time TMswr is a time from when the user is operated to the operation position POSop until when the user is switched to the shift range RNGsh corresponding to the operation position POSop. The range switching time TMswr corresponds to the shift-operation determination time TMshf.

Figures 2, 3:
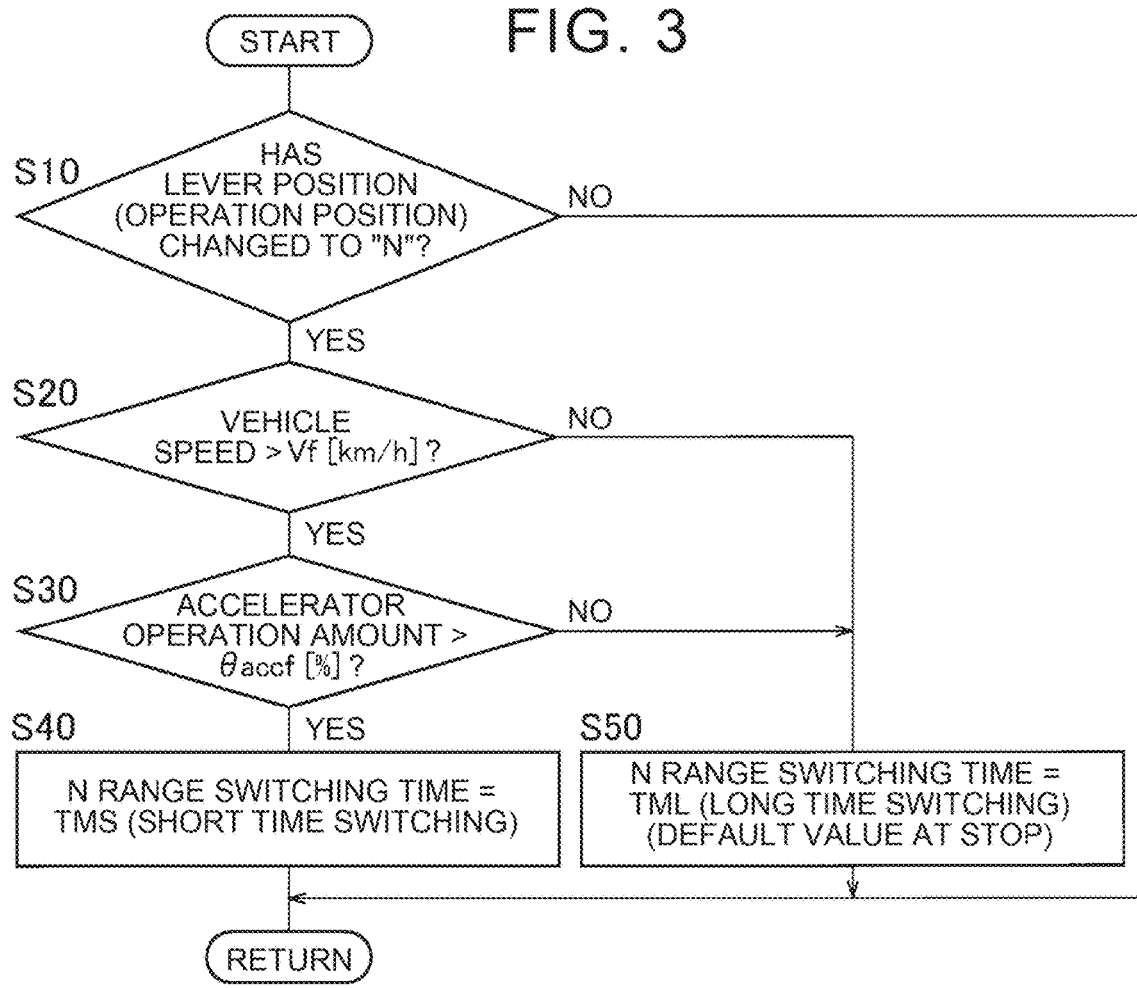
FIG. 2 is a diagram illustrating an example of an N-range switching time.
FIG. 3 is a flowchart for explaining a main part of a control operation of the electronic control device, and is a flowchart for explaining a control operation for improving an erroneous switching prevention performance to an N range and a switching response performance during traveling.

FIG. 2 is a table for explaining an exemplary N-range switching time TMswrn from when the range switching time TMswr is operated to the N-operation position until when the range is switched to the N-range. In FIG. 2, the N operation determination time TMshfn is a shifting operation determination time TMshf used for determining whether or not an operation is performed at the N operation position based on whether or not a time continuously held after the operation is performed at the N operation position has elapsed. When the shift operation to the N operation position is determined, the operation is immediately switched to the N range. Therefore, the N-range switching time TMswrn corresponds to the N-operation determination time TMshfn.

The N-operation determination time TMshfn is set to a default value when the vehicle state is the stop state. In the stop state, since the urgency of switching to the N range is low, the improvement of the erroneous switching prevention performance to the N range for the erroneous operation to the N operation position is prioritized. For this reason, the default value in the stop condition is a predetermined value for a predetermined length of time, that is, a predetermined long time TML for preventing erroneous switching to the N range.

On the other hand, in the traveling state, it is conceivable to prioritize the improvement of the N-range switching response performance in view of a situation in which the driving force Fr is desired to be cut off. Therefore, in the traveling state, it is conceivable that the N-operation determination time TMshfn is set to a predetermined value for a predetermined short time, that is, a predetermined short time TMS for quickly switching to the N range, which is a time shorter than the default value in the stopped state. However, even in the traveling condition, when the accelerator is off, it is difficult for the driving force Fr to be cut off (interrupted) in a sudden manner. Therefore, when the N-operation determination time TMshfn in the traveling condition is uniformly the predetermined short time TMS, there is a possibility that the N-range may be switched to the N-range more than required due to an erroneous operation to the N-operation position during traveling. Therefore, the shift control unit 74 shortens the N-operation determination time TMshfn, that is, the N-range switching time TMswrn, as compared with the case where the driving force Fr in the drive wheels 14 is higher. The shift control unit 74 calculates the driving force Fr using at least one of the vehicle speed V and the accelerator operation amount θacc. When the driving force Fr is higher, for example, the driving force Fr exceeds the predetermined driving force Frf. When the driving force Fr exceeds the predetermined driving force Frf, it includes, for example, at least one of a case where the vehicle speed V exceeds the predetermined vehicle speed Vf and a case where the accelerator operation amount θacc exceeds the predetermined accelerator operation amount θaccf. The predetermined vehicle speed Vf, the predetermined driving force Frf, and the predetermined accelerator operation amount θaccf are predetermined thresholds for determining that there is a possibility that the driving force Fr is to be cut off in a sudden manner, for example. Referring to FIG. 2, the N-operation determination time TMshfn in the traveling condition is set to the predetermined short time TMS when the accelerator is on, and is set to the predetermined long time TML when the accelerator is off, for example. The accelerator on is, for example, a case where the accelerator operation amount θacc exceeds the predetermined accelerator operation amount θaccf. The accelerator off is, for example, a case where the accelerator operation amount θacc is equal to or smaller than the predetermined accelerator operation amount θaccf.

As described above, the shift control unit 74 changes the N-operation determination time TMshfn, that is, the N-range switching time TMswrn, based on the vehicle condition.

FIG. 3 is a flowchart for explaining a main part of the control operation of the electronic control device 70, and is a flowchart for explaining a control operation for improving the performance of preventing erroneous switching to the N range and the switching response performance during traveling, and is repeatedly executed, for example.

In FIG. 3, each step of the flowchart corresponds to the function of the shift control unit 74. First, in S10 of steps (hereinafter, step is omitted), it is determined whether or not the operation position POSop of the shift operation device 50, for example, the lever position Plev of the shift lever 52 has changed to the N operation position. If the determination of this S10 is negative, the routine is terminated. When the determination of S10 is affirmative, it is determined in S20 whether or not the vehicle speed V exceeds the predetermined vehicle speed Vf. If the determination of S20 is affirmative, it is determined in S30 whether the accelerator operation amount θacc exceeds the predetermined accelerator operation amount θaccf. When the determination of S30 is affirmative, the N-range switching time TMswrn is set to the predetermined short time TMS in S40. When the determination of S20 is negative, or when the determination of S30 is negative, the N-range switching time TMswrn is set to the predetermined long time TML in S50. When the vehicle is stopped, the N-range switching time TMswrn is defaulted.

As described above, according to the present embodiment, the N-range switching time TMswrn is shortened as compared with the case where the driving force Fr is higher. As a result, when the driving force Fr is relatively high, the driving force Fr may be desired to be cut off, and the driving force Fr may be switched to the N range in a relatively short period after being operated to the N-operation position. On the other hand, when the driving force Fr is relatively low, the situation is highly likely not to be the situation is not the situation in which the driving force Fr is desired be cut off, and the driving force is switched to the N range over a relatively long period after being operated to the N-operation position. Therefore, it is possible to improve the performance of preventing erroneous switching to the N range and the switching response performance during traveling.

Further, according to the present embodiment, the driving force Fr is calculated using at least one of the vehicle speed V and the accelerator operation amount θacc. Accordingly, whether the driving force Fr is high or low can be determined using at least one of the vehicle speed V and the accelerator operation amount θacc.

Further, according to the present embodiment, the driving force Fr includes at least one of a case where the vehicle speed V exceeds the predetermined vehicle speed Vf and a case where the accelerator operation amount θacc exceeds the predetermined accelerator operation amount θaccf. Accordingly, when the vehicle speed Vis relatively high or when the accelerator operation amount θacc is relatively large, the vehicle speed V is switched to the N range in a relatively short time after being operated to the N operation position.

Further, according to the present embodiment, the shift operation device 50 has a plurality of types of absolute positions in which the operation element is operated with respect to the home position as the operation position POSop. The N-range switching time TMswrn corresponds to the N-operation determination time TMshfn. When the driving force Fr is higher, the N-operation determination time TMshfn is shorter than when the driving force is lower. Thus, when the driving force Fr is relatively high, the driving force is appropriately switched to the N range in a relatively short period after being operated to the N operation position. On the other hand, when the driving force Fr is relatively low, the driving force is appropriately switched to the N range over a relatively long period after being operated to the N operation position.

Next, another embodiment of the present disclosure will be described. In the following description, parts common to the embodiments are denoted by the same reference numerals, and description thereof will be omitted.

Second Embodiment

FIGS. 4A to 4C are diagrams illustrating a shift operation device 100 different from the shift operation device 50 according to the first embodiment. In the present embodiment, the shift operation device 100 is used instead of the shift operation device 50 as the operation device operated by the driver in the operation position POSop corresponding to the shift range RNGsh of the automatic transmission 18. As shown in FIG. 4A, the shift operation device 100 includes a straight lever 102 that is selectively operated by the driver to a plurality of operation positions POSop corresponding to the plurality of shift ranges RNGsh. The straight lever 102 is an automatic return type operation element that is returned to the original position in a state where no external force is applied, and is provided in place of the shift lever 52 in the above-described first embodiment. This original position is a home position (see "Home" in the drawing). The shift operation device 50 has a plurality of relative positions at which the straight lever 102 is operated with respect to the home position as operation position POSop predetermined for each shift range RNGsh. The plurality of relative positions includes, for example, a, b, c, d operation positions, and the like. Each of the operation positions a and c is moderate. As illustrated in FIG. 4B, for example, when the shift range RNGsh is in the N range, the a and b operation positions are set to the R operation positions, and the c and d operation positions are set to the D operation positions. When the shift range RNGsh is in the D range, the a operation position is set to the N operation position, the b operation position is set to the R operation position, and the c and d operation positions are set to the B operation position. The a, b, c, and d operation positions are associated with any of the R, N, D, and B operation positions by the shift range RNGsh.

After determining the shift operation, the shift control unit 74 sets the required range after the lapse of the range switching delay time TMswd, and outputs the shift range command signal Srngsh to the travel control unit 72. The range switching delay time TMswd is a predetermined time from when it is determined that the operation is performed at the operation position POSop to when it is switched to the shift range RNGsh corresponding to the operation position POSop. The range switching time TMswr corresponds to the sum time of the shift-operation determination time TMshf and the range switching delay time TMswd.

As shown in FIG. 4C, the N-range switching time TMswrn corresponds to the sum time of the N-operation determination time TMshfn and the N-range switching delay time TMswdn from when it is determined that the N-operation position has been operated until when the N-range is switched. Unlike the shift operation device 50, the R, N, D, and B operation positions of the shift operation device 100 are set by relative positions with respect to the home position corresponding to the shift range RNGsh. Therefore, the N-operation determination time TMshfn is set to a predetermined short time TMS regardless of the vehicle condition. In the stop state and the accelerator-on running state, the N-range switching delay times TMswdn are set to zero, respectively. Therefore, in the stop state and the accelerator-on running state, the N-range switching time TMswrn is set to the N-operation determination time TMshfn, that is, the predetermined short time TMS. On the other hand, in the accelerator-off mode, a predetermined N-range switching delay TMswdn is set. The N-range switching time TMswrn is set to a predetermined long time TML obtained by summing the N-operation determination time TMshfn and the N-range switching delay time TMswdn. As described above, the shift control unit 74 shortens the N-range switching time TMswrn by shortening the N-range switching delay time TMswdn as compared with the case where the driving force Fr is higher. The predetermined short time TMS and the predetermined long time TML may each have the same value as the value in the first embodiment or may have different values.

Figure 5:
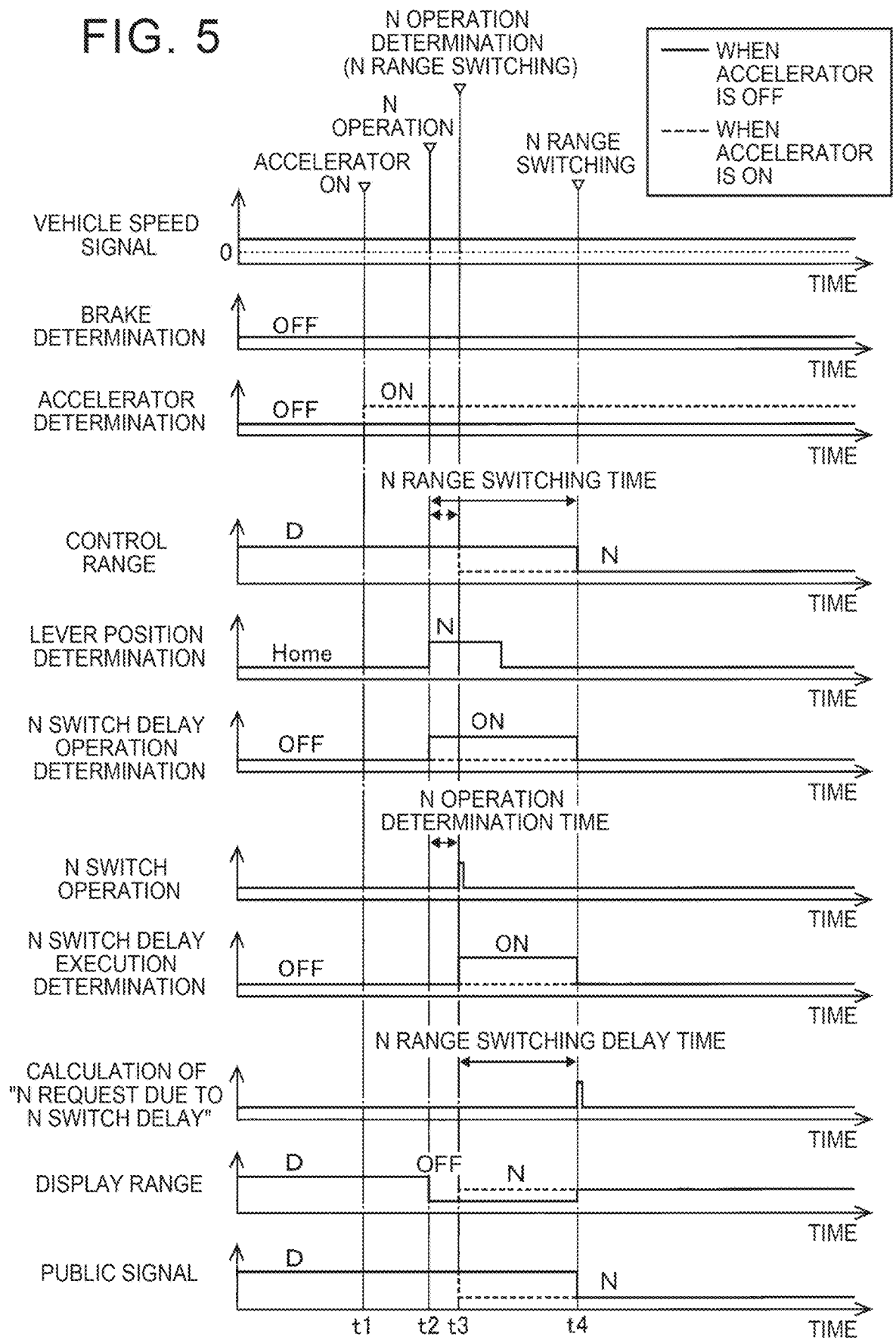
FIG. 5 is a diagram showing an example of a time chart when the control operation shown in the flow chart of FIG. 3 is executed in a second embodiment.

FIG. 5 is a diagram illustrating an example of a time chart when the control operation illustrated in the flowchart of FIG. 3 is executed in the present embodiment including the shift operation device 100. In FIG. 5, t1 time point indicates a time point at which the accelerator ON is determined in the embodiment at the time of the accelerator ON indicated by the broken line. t2 time point indicates a time point at which the straight lever 102 changes from the home position to the a operation position, that is, the N operation position, when the shift range RNGsh is the D range. t3 time point indicates a time point at which the N operation determination time TMshfn, that is, the predetermined short time TMS has elapsed from t2 time point, and the shifting operation to the N operation position has been determined. When the accelerator is turned on as indicated by the broken line, the N-range switching time TMswrn is set to TMS for a predetermined short time, and thus the accelerator is switched to the N-range at t3 time point. On the other hand, when the accelerator is off, which is indicated by a solid line, the N-range switching time TMswrn is set to a predetermined long time TML obtained by summing the N-operation determination time TMshfn and the N-range switching delay time TMswdn, and is therefore switched to the N-range at t4 time point.

As described above, according to the present embodiment, it is possible to improve the performance of preventing erroneous switching to the N range and the switching response performance during traveling as in the above-described first embodiment.

Further, according to the present embodiment, the shift operation device 50 has each of a plurality of relative positions at which the straight lever 102 is operated with respect to the home position as operation position POSop predetermined for each shift range RNGsh. The N-range switching time TMswrn is the sum time of the N-operation determination time TMshfn and the N-range switching delay time TMswdn. In addition, the N-range switching delay time TMswdn is shortened as compared with the case where the driving force Fr is higher. Thus, when the driving force Fr is relatively high, the driving force is appropriately switched to the N range in a relatively short period after being operated to the N operation position. On the other hand, when the driving force Fr is relatively low, the driving force is appropriately switched to the N range over a relatively long period after being operated to the N operation position.

Third Embodiment

In the present embodiment, the power source 12 includes an electric motor MG (see FIG. 1). The travel control unit 72 is capable of generating regenerative torque, that is, regenerative braking by the electric motor MG, for example, during deceleration travel of the vehicle 10.

Incidentally, when the automatic transmission 18 is set to the N range in a state in which the drive shaft 26 and the propeller shaft 22 are twisted by the regenerative torque, there is a possibility that a shock due to the release of the twist may occur. If the sudden change in regenerative torque is small at the time of switching to the N range, the occurrence of shock can be suppressed. On the other hand, in the accelerator-off traveling condition in which the regenerative torque is generated, the N-range switching time TMswrn is set to the predetermined long time TML.

Therefore, when the operation element is operated to the N operation position when the driving force Fr is low, the travel control unit 72 gradually decreases the regenerative torque toward zero during the transient of the N range switching time TMswrn in accordance with the magnitude of the regenerative torque by the electric motor MG. That is, the travel control unit 72 gradually decreases the regenerative torque during the transient of the N-range switching time TMswrn, and sets the regenerative torque to zero when switching to the N-range. When the regenerative torque is small, it is difficult to cause a shock, and therefore, when the regenerative torque is small enough not to cause a shock, control for gradually decreasing the regenerative torque may not be performed. Therefore, the travel control unit 72 performs control to gradually decrease the regenerative torque in accordance with the magnitude of the regenerative torque.

Figure 6:
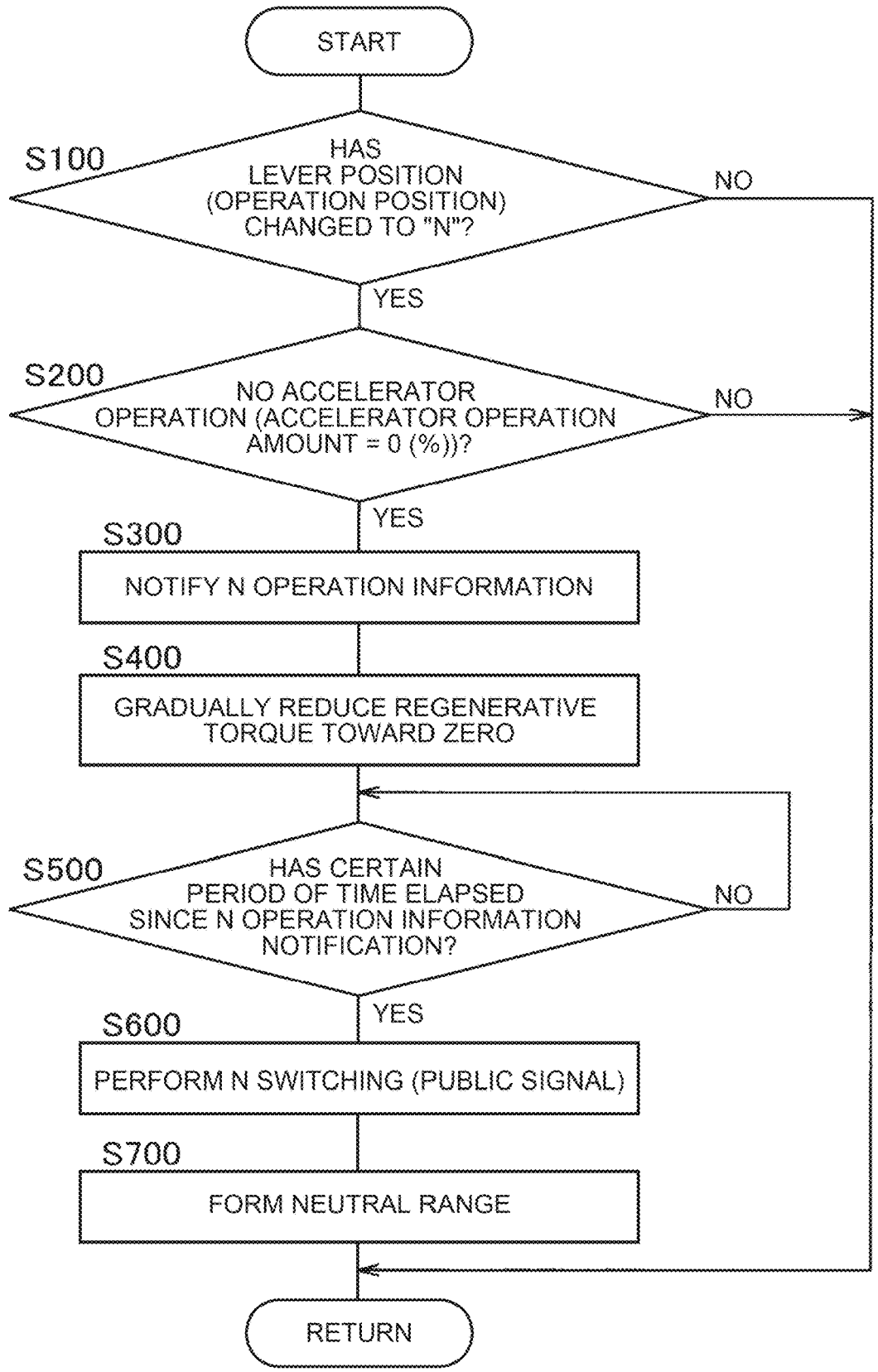
FIG. 6 is a flowchart for explaining a main part of a control operation of the electronic control device, and is a flowchart for explaining a control operation for suppressing a shock at the time of N-range switching according to a generation state of regenerative torque.

FIG. 6 is a flowchart for explaining a main part of a control operation of the electronic control device 70. FIG. 6 is a flowchart for explaining a control operation for suppressing a shock at the time of N-range switching according to the generation state of the regenerative torque, and is repeatedly executed, for example, at the time of generation of the regenerative torque. However, the regenerative torque may not be executed when the regenerative torque is small enough to prevent the shock from occurring. In the flow chart of FIG. 6, for example, the shift operation device 50 in the above-described first embodiment and the shift operation device 100 in the above-described second embodiment are used as an operation device operated to the operation position POSop corresponding to the shift range RNGsh.

In FIG. 6, first, in a S100 corresponding to the function of the shift control unit 74, it is determined whether or not the operation position POSop of the shift operation devices 50 and 100 has changed to the N operation position. When the determination of S100 is affirmative, it is determined in S200 corresponding to the function of the shift control unit 74 whether or not the accelerator is not operated, that is, the accelerator is off. When the determination of S200 is affirmative, the travel control unit 72 is notified of the N operation information indicating that the operation is performed at the N operation position in S300 corresponding to the function of the shift control unit 74. Next, in S400 corresponding to the function of the travel control unit 72, the regenerative torque is gradually decreased toward zero. Next, in S500 corresponding to the function of the shift control unit 74, it is determined whether or not a certain period of time has elapsed since the notification of the N-operation information, that is, whether or not the N-range switching time TMswrn has elapsed. If the determination of S500 is negative, S500 is repeatedly executed. When the determination of S500 is affirmative, the shift range command Srngsh for switching to the N range is outputted to the travel control unit 72 in S600 corresponding to the function of the shift control unit 74. Next, an N range is formed in S700 corresponding to the function of the travel control unit 72.

As described above, according to the present embodiment, when the operation element is operated to the N operation position, the regenerative torque is gradually decreased toward zero during the transient of the N-range switching time TMswrn in accordance with the magnitude of the regenerative torque. Thus, the shock caused by the sudden change in the regenerative torque at the time of switching to the N range is reduced.

Although the embodiments of the disclosure have been described in detail with reference to the drawings, the disclosure is also applicable to other modes.

For example, in the flow chart of FIG. 3 described above, S40 may be executed when the determination of either S20 or S30 is affirmative.

When the above-described vehicle 10 is equipped with a brake override (BOS), the same N-operation determination time TMshfn may be set as when the vehicle is stopped when the brake is on.

Further, the shift operation devices 50 and 100 described above may be operation devices other than the momentary type. In short, the present disclosure can be applied to vehicles in which the shift range RNGsh is switched using the shift-by-wire method.

Further, the shift operation devices 50 and 100 described above may be an operation device including one operation element such as a lever or a dial or an operation element in which a plurality of switches and the like are connected. The lever/dial is operated to each operation position POSop and each operation position POSop corresponding to each shift range RNGsh.

Further, the above-described switching device 60 may be a switching device in which the operating position of the electric actuator 61 is switched to a position corresponding to the respective shift range RNGsh.

Further, the above-described power transmission device 16 may not include the automatic transmission 18. That is, the vehicle 10 may be a vehicle that does not include the automatic transmission 18, for example, an electrified vehicle that travels by driving an electric motor with electric power from a battery.

The above description is merely an embodiment, and the disclosure can be implemented in various modified and improved modes based on the knowledge of those skilled in the art.

What is claimed is:

1. A control device for a vehicle, the vehicle including a power source, a power transmission device configured to transmit power from the power source to a drive wheel, and an operation device configured to be operated by a driver to an operation position corresponding to a shift position of the power transmission device, the power transmission device being a device configured in such a manner that the shift position is switched by electrical control based on the operation position, the shift position including a neutral position in which power transmission in the power transmission device is interrupted, and the operation position including a neutral operation position for selecting the neutral position, the control device comprising a shift control unit configured to change a neutral position switching time based on a vehicle state, the neutral position switching time being a time from when the operation device is operated to the neutral operation position to when the shift position is switched to the neutral position, wherein
the shift control unit sets the neutral position switching time to a smaller value when a driving force of the drive wheel is large than when the driving force of the drive wheel is small.

2. The control device according to claim 1, wherein the shift control unit calculates the driving force of the drive wheel by using either or both of a vehicle speed and an accelerator operation amount.

3. The control device according to claim 1, wherein:
the operation device includes an automatic return type operation element configured to be returned to an original position when no external force is applied, and the operation device includes, as the operation position, a plurality of types of absolute positions including the neutral operation position to which the operation element is operated with respect to the original position;
the neutral position switching time is a neutral operation determination time that is used to determine whether the operation device has been operated to the neutral operation position based on whether a continuous hold time has elapsed since the operation device was operated to the neutral operation position; and
the shift control unit sets the neutral operation determination time to a smaller value when the driving force of the drive wheel is large than when the driving force of the drive wheel is small.

4. The control device according to claim 1, wherein:
the operation device includes an automatic return type operation element configured to be returned to an original position when no external force is applied, and the operation device includes, as the operation position determined in advance for each shift position, a plurality of relative positions to which the operation element is operated with respect to the original position;
the neutral position switching time is a sum of a neutral operation determination time and a neutral position switching delay time, the neutral operation determination time being a time that is used to determine whether the operation device has been operated to the neutral operation position based on whether a continuous hold time has elapsed since the operation device was operated to the neutral operation position, and the neutral position switching delay time being a time from when the operation device was operated to the neutral operation position to when the shift position is switched to the neutral position; and
the shift control unit sets the neutral position switching delay time to a smaller value when the driving force of the drive wheel is large than when the driving force of the drive wheel is small.

5. The control device according to claim 1, wherein the power source includes an electric motor, the control device further including a travel control unit configured to generate regenerative torque by the electric motor, wherein
when the operation device is operated to the neutral operation position while the driving force of the drive wheel is small, the travel control unit gradually decreases the regenerative torque toward zero during the neutral position switching time according to a magnitude of the regenerative torque.

\* \* \* \* \*